Dec. 11, 1962     J. N. SHOOLERY ET AL     3,068,398
GYROMAGNETIC RESONANCE METHOD AND APPARATUS
Filed Nov. 13, 1953     5 Sheets-Sheet 1
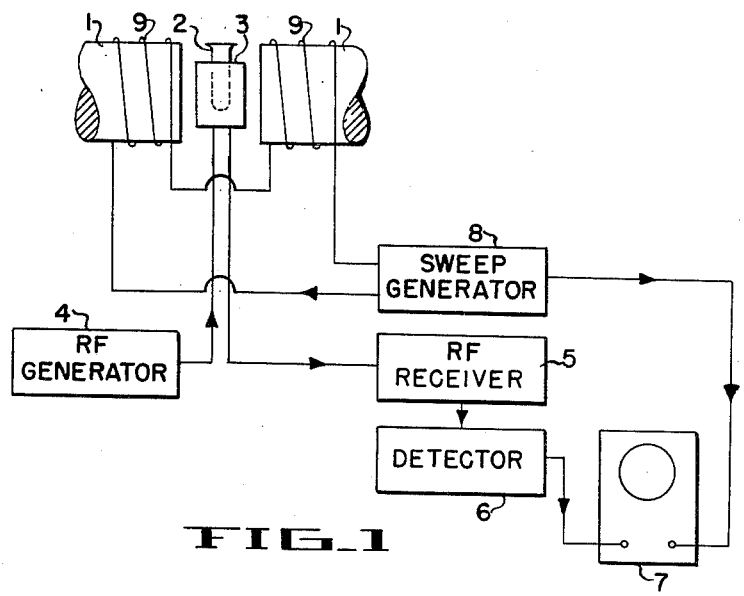
FIG_1
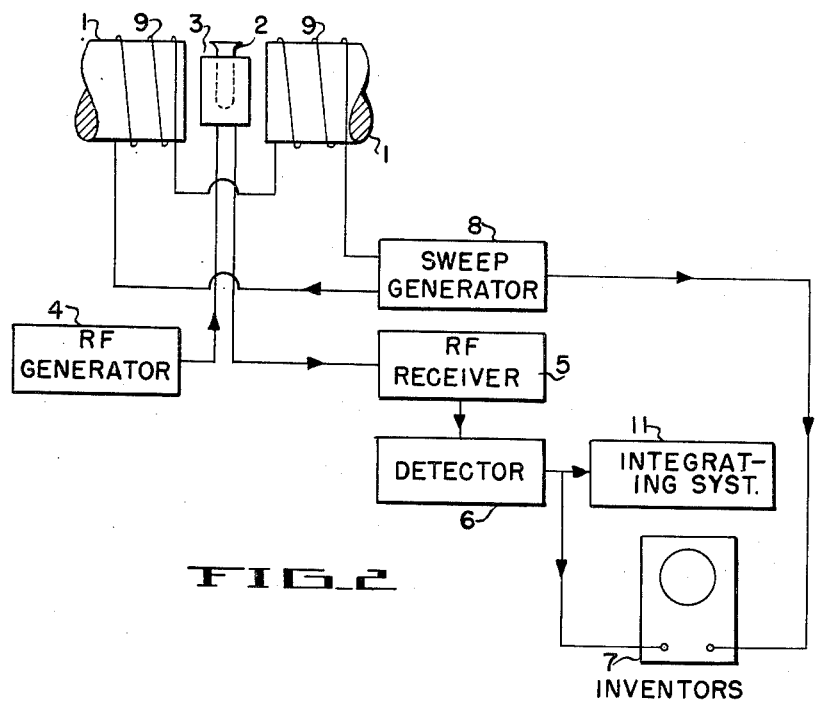
FIG_2
INVENTORS
JAMES N. SHOOLERY
SIGURD F. VARIAN
BY Paul B. Hunter Dec. 11, 1962 J. N. SHOOLERY ET AL 3,068,398
GYROMAGNETIC RESONANCE METHOD AND APPARATUS
Filed Nov. 13, 1953 5 Sheets—Sheet 2
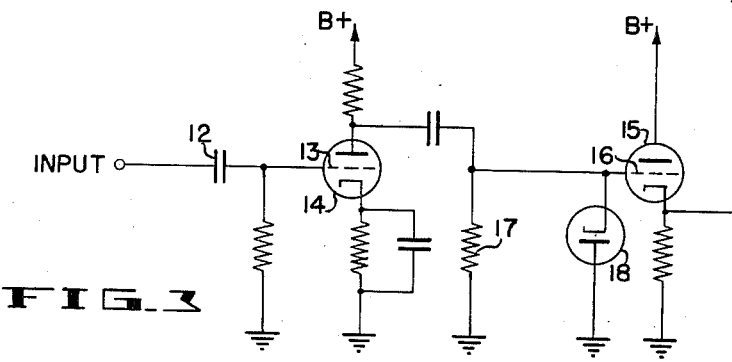
FIG_3
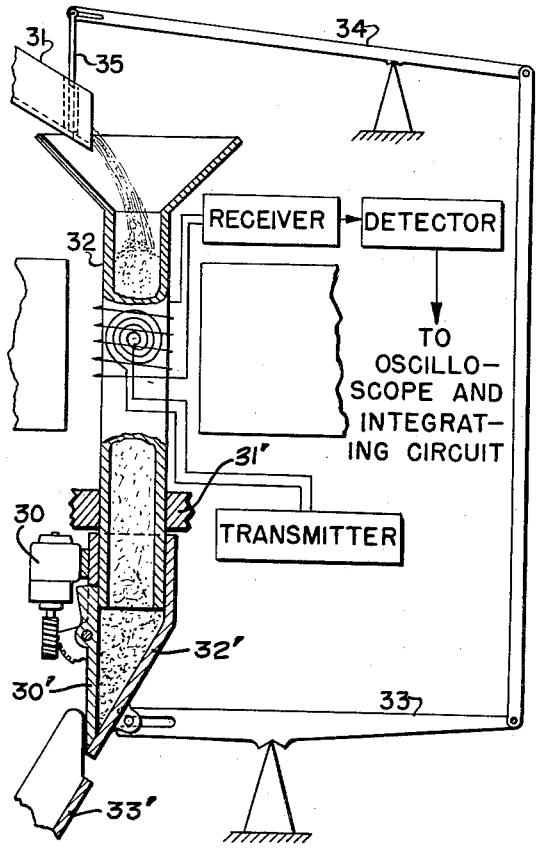
FIG_4
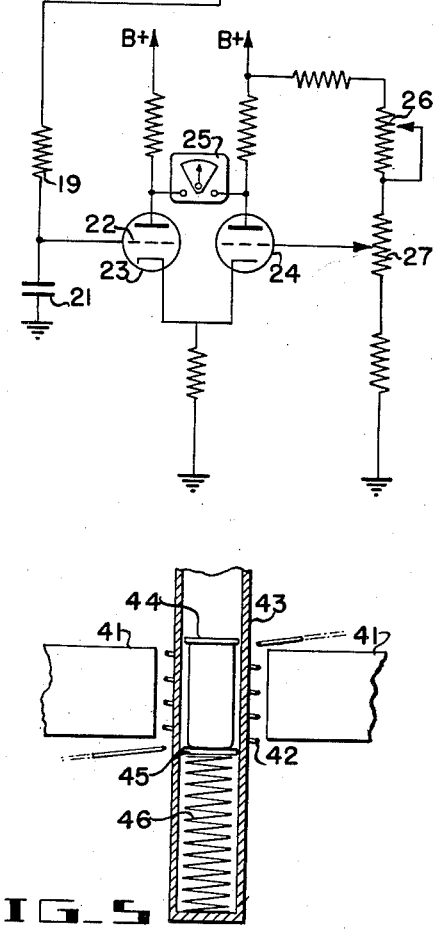
FIG_5
INVENTORS
JAMES N. SHOOLERY
SIGURD F. VARIAN
BY Paul B. Hunter

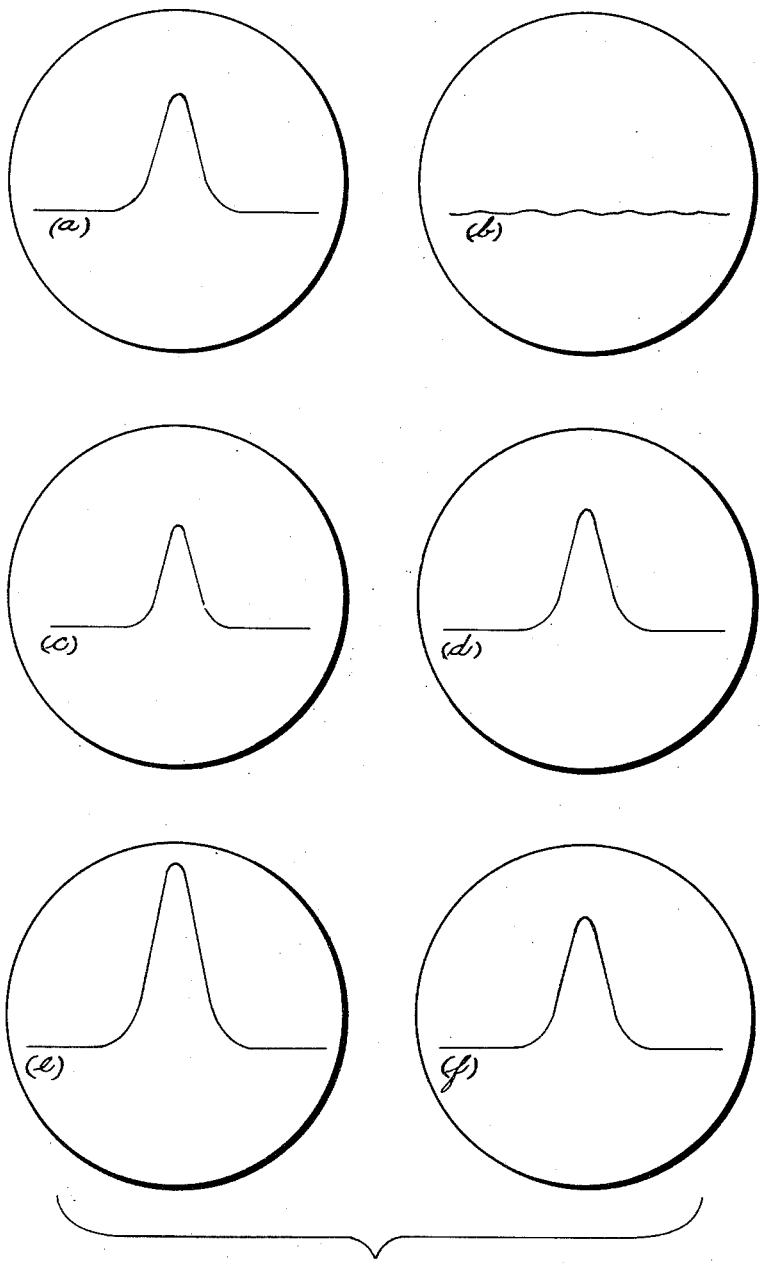
FIG_6

Dec. 11, 1962   J. N. SHOOLERY ET AL   3,068,398
GYROMAGNETIC RESONANCE METHOD AND APPARATUS
Filed Nov. 13, 1953   5 Sheets-Sheet 5
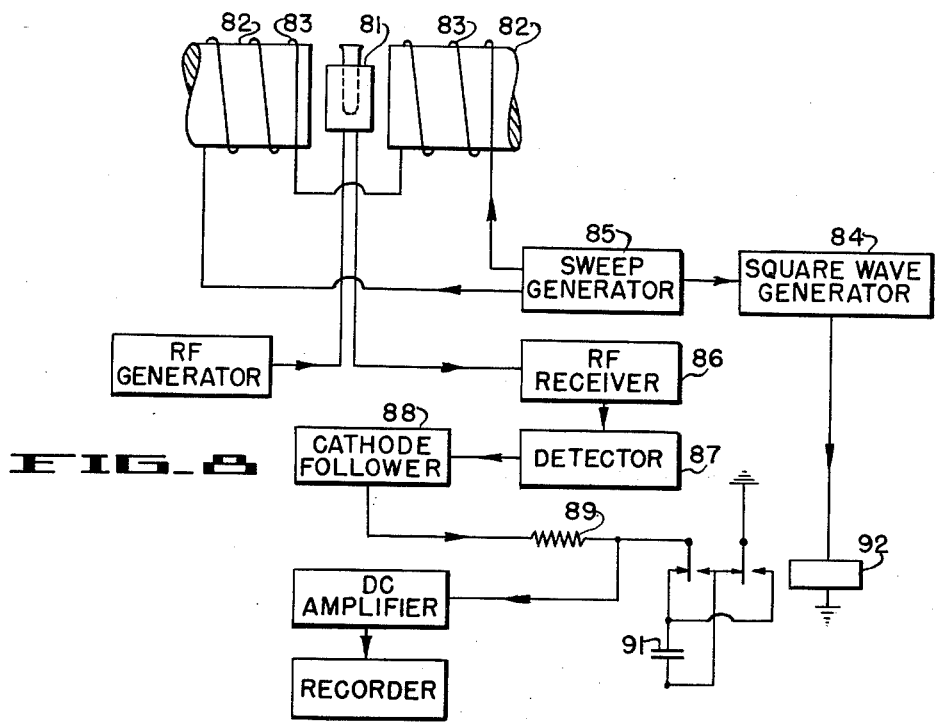
FIG_8
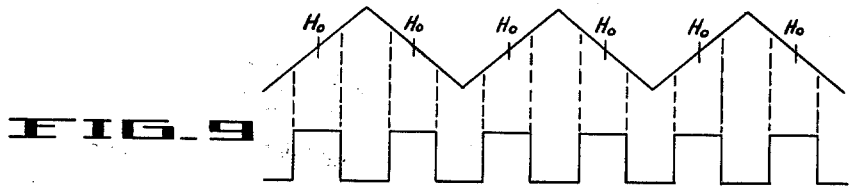
FIG_9
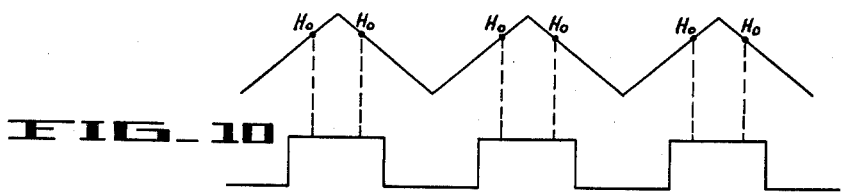
FIG_10
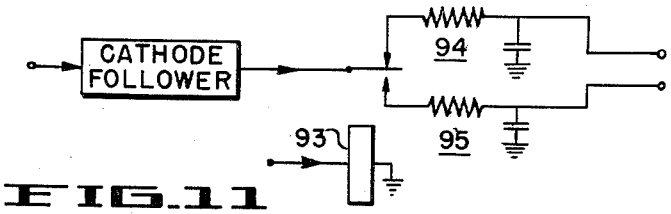
FIG_11
INVENTORS
JAMES N. SHOOLERY
SIGURD F. VARIAN
BY Paul B. Hunter United States Patent Office 3,068,398
Patented Dec. 11, 1962

3,068,398
GYROMAGNETIC RESONANCE METHOD AND APPARATUS
James N. Shoolery, Palo Alto, and Sigurd F. Varian, Menlo Park, Calif., assignors to Varian Associates, San Carlos, Calif., a corporation of California
Filed Nov. 13, 1953, Ser. No. 392,006
7 Claims. (Cl. 324—0.5)

This invention relates, generally, to gyromagnetic resonance and, more particularly, to novel methods and means for utilizing gyromagnetic resonance to chemically analyze substances in mixtures and compounds rapidly and without destruction of the substance.

One object of this invention is to provide a novel gyromagnetic resonance method and means for distinguishing between different chemical substances, mixtures and compounds.

Another object of this invention is to provide a novel gyromagnetic resonance method and means for determining the relative proportions of different substances in a mixture.

Still another object of this invention is to provide novel gyromagnetic resonance method and means for differentiating between substances having like portions of atoms.

Another object of this invention is to provide novel method and means utilizing gyromagnetic resonance to distinguish between and to determine the relative and absolute amounts of oil and water present in a mixture.

Another object of this invention is to provide novel method and means utilizing gyromagnetic resonance to determine the amount of water present in a substance, such as cereal, flour, salt, gasoline, etc.

Other objects and advantages of this invention will become apparent from a perusal of the following specification taken in connection with the accompanying drawings wherein FIG. 1 discloses a gyromagnetic resonance system which may be utilized when employing the novel method of this invention for chemically analyzing various substances rapidly and non-destructively.

FIG. 2 depicts a novel gyromagnetic system which utilizes the novel method of this invention for chemical analysis wherein the results of the analysis are presented to the operator without undue computations.

FIG. 3 shows a novel electronic integrating circuit which is used in the system of FIG. 2, FIG. 4 shows a novel structure for chemically analyzing fixed amounts by weight of a substance in a continually flowing process.

FIG. 5 shows a modification of the above embodiments wherein a known and calibrated substance is utilized as a standard in the gyromagnetic resonace apparatus as a basis for comparing samples of the substance.

Figure 7:
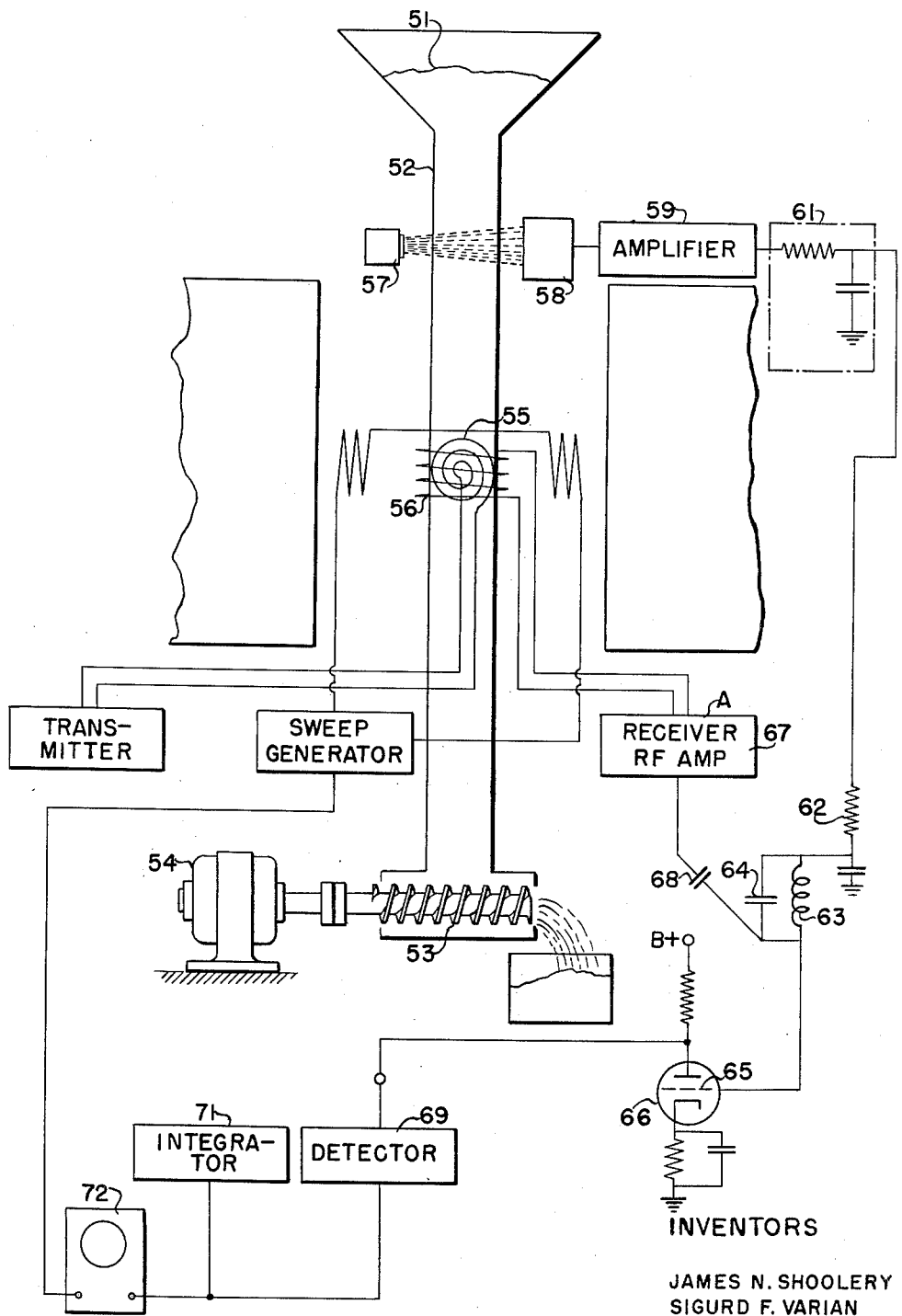

FIG. 6 shows six oscilloscope traces of the resonance signal obtained from the protons in sandstone oil core, one pair of signals being obtained from a core having water alone, the second pair being obtained from a core having oil alone, and the third pair being obtained from a core having a mixture of oil and water, FIG. 7 depicts a novel gyromagnetic resonance system which automatically compensates for the density variations in progressive samples to give a corrected percentage reading of the moisture content, FIG. 8 discloses another novel electronic integrating circuit which may be utilized in lieu of that shown in FIG. 3 in the gyromagnetic system, FIGS. 9 and 10 are curves which help to illustrate the operation of the novel integrating system of FIG. 8, and FIG. 11 shows another embodiment of an integrating circuit which may be utilized in place of that shown in FIG. 8.

Referring now to FIG. 1 there is shown in block diagram form a gyromagnetic resonance system of the type which is disclosed in U.S. Patent 2,561,489, issued to F. Bloch et al. on July 24, 1951, entitled "Method and Means for Chemical Analysis by Nuclear Inductions," and which may be employed in performing the novel chemical analysis method described and claimed herein. The utilization of the gyromagnetic resonance phenomena in certain cases requires that the gyromagnetic substance, which contains portions of atoms having the properties of magnetic moment and gyroscopic moment such as, for example, nuclei and electrons, be positioned in a unidirectional magnetic field to thereby polarize the portions of atoms. In this particular illustration in FIG. 1 the unidirectional magnetic field is supplied by a permanent magnet 1. The gyromagnetic substance is positioned between the pole faces of the magnet by means of a test tube 2 within a holder or probe 3 of the general type disclosed in United States patent application of Leonard Malling et al., filed July 6, 1953, entitled "Gyromagnetic Resonance Apparatus," bearing Serial No. 366,156, now U.S. Patent No. 2,944,212, issued July 5, 1960. The probe includes a transmitter coil and a receiver coil (not shown), the transmitter coil and receiver coil being so positioned in the probe so that these two coils and the magnetic field produced by the magnet 1 are all mutually perpendicular. The transmitter coil is connected to a source of radio frequency energy 4. The receiver coil is coupled to a radio frequency receiver 5, the output of which is coupled to a detector 6 which in turn is connected to the vertical plates of an oscilloscope 7. In operation, taking nuclear resonance for illustration purposes, when the frequency of the radio frequency energy transmitted to the transmitter coil is at resonance, that is, equal to the Larmor precession frequency of the nuclei of the substance in the applied polarizing magnetic field, an appreciable number of the nuclei will precess in phase. As known in the art, at resonance $\omega = \gamma H$, where $\omega$ is the angular rate of applied radio frequency field,
$\gamma$ is the gyromagnetic ratio of the nuclei, and
H is the strength of the polarizing magnetic field.

The precessing nuclei will induce radio frequency E.M.F. in the receiver coil which is transmitted to the R.F. receiver 5, the value of the E.M.F. being determined by the number of precessing nuclei. The sweep generator 8 and associated coils 9 provide an audio frequency sweep signal to modulate the unidirectional magnetic field so that the point of resonance will be slowly and periodiclaly swept through, thus producing uniformly spaced induced surges of radio frequency E.M.F. in the receiver coil. The induced radio frequency E.M.F. is amplified in the R.F. receiver 5 and then demodulated in detector 6, the envelope signal being displayed on oscilloscope 7. The audio sweep signal is coupled to the horizontal sweep plates of the oscilloscope 7 to synchronize the scope trace with the modulated magnetic field. The summation or integral E.M.F. of the induced signal is indicated by the area under the signal trace on the scope and the instantaneous E.M.F. by the amplitude of the signal.

Therefore, when investigating unknown substances where the gyromagnetic ratio of the portions of atoms is unknown, the strength of the magnetic field is a known factor and the frequency of the radio frequency energy supplied by the generator 4 is also known and may be selectively variable. The frequency of the radio frequency energy may then be varied until gyromagnetic resonance occurs as indicated by the receipt of a sharp induced signal in the receiver coil. Since the values of H and $\omega$ are now known, the gyromagnetic ratio of the nuclei in the substance under investigation may be determined and since the gyromagnetic ratio is different and distinct for all known isotopes with a magnetic moment, the substance may be identified.

The present inventors have devised a novel and useful method for determining the relative proportions of different substances in a mixture or compound utilizing the above described gyromagnetic system. To more readily explain this novel method a specific example of its application will be described. It will be assumed that the mixture to be investigated is a mixture of oil and water in a porous sandstone core of earth removed from a well bore. Since the portions of atoms which produce gyromagnetic resonance in both the oil and the water are hydrogen nuclei (protons) and since the protons in the water and the protons in the oil have the same gyromagnetic ratio, i.e. will produce resonance at the same frequency of the applied radio frequency field in a given magnetic field, the energy or E.M.F. induced in the receiver coil will be the sum of the E.M.F. induced therein due to the protons in the water plus the E.M.F. induced therein due to the protons in the oil. Since the measurement of this E.M.F. will only yield information regarding the total amount of proton-bearing substances present in the earth core and not the relative amount of each substance, it has heretofore been very difficult to determine the relative amounts of oil and water in the mixture. However, by producing gyromagnetic resonance of the protons in the mixture of oil and water while in one state of existence and recording the E.M.F. of the induced signal and by then changing the state of existence of the mixture and again producing gyromagnetic resonance and comparing the E.M.F. induced in both states of existence, the present inventors are able to determine the relative amounts of water and oil in the mixture.

For example, in one application of the method, gyromagnetic resonance of the protons in the core was produced with the core at room temperature, the total E.M.F. produced by the processing nuclei or protons in the water and oil at resonance being determined. The core was then placed in a bath of Dry Ice and acetone to bring the core down to a temperature of about 195° K. and then the core was again examined by gyromagnetic resonance, the induced E.M.F. again being determined.

In comparing the two E.M.F. signals, a decided difference between the two is noted, viz. the E.M.F. after lowering the temperature is less than the E.M.F. obtained at room temperature. This resultant change in the strength of the induced signal by changing the temperature of the mixture results from the fact that the water in the sample is frozen solid while the oil or kerosene content remains in a fluid state. The protons in the water are, because of the freezing of the water, inhibited in their motion, the protons being held relatively rigid relative to the lattice in the solid state. Accordingly, the line width, that is, the width of the magnetic field over which the hydrogen nuclei in the water resonant, broadens, the resonance signal flattening out to such an extent that it is not observable on the oscilloscope. However, the protons in the kerosene or oil are not affected to the extent the protons in the water are affected and the signal produced by the protons in the oil remains relatively unchanged. Actually the signal due to the protons in the oil is slightly larger at 195° K. than at room temperature by the Boltzmann factor representing a distribution of the protons with a greater excess number of the protons aligned with the applied unidirectional magnetic field. By correcting for the Boltzman factor, the induced E.M.F. which is due to the precessing protons in the oil with the core at room temperature may be easily determined.

It is then known what proportion of the total E.M.F. induced from the core at room temperature is due to the protons in the oil and, therefore, the remaining E.M.F. is due to the protons in the water. The relative amounts of the oil and the water in the mixture are thus easily determined. The specific example of a mixture of oil and water in an earth core is used only for illustration purposes and it should be understood that the novel method applies equally well to many other mixtures and compounds. It should also be understood that the particular change of state of the mixture under investigation, that is, from room temperature to a temperature at which water freezes, was also used as an illustration and other changes in relative temperatures as well as other changes in state of existence such as, for example, changes in pressure, such that the relaxation times for the portions of atoms such as protons are affected differently for the different substances in the mixture or compound, may also be utilized in working the present method. It should be understood that when the terms "change of state" or "change of state of existence" are used herein they are not intended to mean the absolute changes in state such as from a gas to a liquid or from a liquid to a solid but are meant to mean, rather, a change from the present existence or environment of a substance such as, for example, by lowering the temperature of a liquid without changing the liquid to a solid.

To further illustrate the results of this method there is shown in FIG. 6 a set of oscilloscope traces as viewed on the oscilloscope 7 of the gyromagnetic resonance system of FIG. 1. Curve (a) is a trace of the nuclear resonance signal produced by the protons in a core which included water but not oil. The signal (a) was produced with the core at room temperature. The trace (b) is a trace of the proton resonance signal from the same core after the core had been frozen. It will be noted that in (b) the signal has flattened out to such an extent that resonance is not evident. The curve labeled (c) is a trace of the proton resonance of a second core at room temperature, this core containing oil but no water. The curve labeled (d) is the resonance signal obtained from this second core after lowering to a temperature sufficient to freeze water but not oil and it will be noted that the E.M.F. evidenced by this resonance signal is slightly larger than that obtained with the core at room temperature for reasons explained above. The curve (e) is the signal trace obtained from nuclear resonance of the protons in a third core which contained both water and oil, the measurement being made at room temperature. The signal trace (f) was produced from the same core containing the oil and water after the water in the core had been frozen and, assuming that the number of protons in the second core was the same as the number of oil protons in the third core, the traces (d) and (f) are approximately identical.

It should also be noted that this method is also applicable where the one substance which is in the presence of another substance may have its state of existence changed without changing the state of existence of the other substance. For example, if one were to have an oil and water core positioned in close relationship to a mass of other material which also contains hydrogen nuclei or protons, the core and this foreign mass may be investigated with gyromagnetic resonance to obtain composite nuclear resonance signal due to all the protons present in this mixture. The core could then have its state of existence changed such as, for example, by lowering the temperature of the core without lowering the temperature of the foreign mass of materials. The resultant change in the nuclear resonance signal obtained when this foreign mass and core are again examined by nuclear resonance would be entirely dependent on the change of existence of the core since the mass of foreign material was not in any way changed. In this case it is noted that the state of existence of one mixture or compound or substance is changed relative to that of another substance.

FIGS. 2 and 3 disclose a novel system for use in performing gyromagnetic resonance measurements including the above described method wherein the amount of E.M.F.

induced by the precessing nuclei is automatically indicated to the observer without any computations.

In the case of earth core examination for oil and water content, the operator merely inserts the core to be examined in the probe 2, adjusts a dial to give a certain reading on a built-in meter or recorder and then immediately reads the automatically calculated result. This permits the use of the apparatus by unskilled persons while making numerous production runs. In this novel system the output from the detector circuit is coupled to an integrating system 11 which automatically determines and gives a dial reading of the summation E.M.F. induced in the receiver coil.

Referring to FIG. 3 there is shown therein one novel integrating system which may be utilized in the gyromagnetic resonance system of FIG. 2. The output from the detector 6 is coupled through a condenser 12 to the control grid 13 of a triode amplifier tube 14. The amplified output from this amplifier tube 14 is coupled to a clamper circuit including a triode 15, the grid 16 of which is connected to ground through bias resistor 17 and a diode 18. The clamper circuit operates in a well known manner to maintain the output signal of the clamper circuit always at a positive potential. The output from the cathode follower tube 15 is coupled to an integrator circuit comprising resistor 19 and a condenser 21. The integrated D.C. signal obtained from this integrator circuit is coupled to the grid 22 of one tube 23 in a balancing null-indicator circuit. This null indicator circuit comprises the tube 23 coupled in parallel with a second tube 24, the anodes of which are connected through a galvanometer 25. The two tubes 23 and 24 are balanced initially, with the substance removed from the probe, or with the gyromagnetic substance in the probe and the polarizing magnetic field adjusted so that the system is off resonance, by means of a rheostat 26 such that the galvanometer 25 gives a null or zero reading, the dial of the helical potentiometer 27 being first set to a predetermined setting. Upon receipt of an input signal from the integrator circuit, when gyromagnetic resonance of the substance to be examined is produced, the tubes are no longer balanced and the galvanometer pointer moves off the null point. The calibrated helical potentiometer 27 is employed to adjust the bias on the tube 24 so as to bring the galvanometer 25 to a zero setting. The distance the dial on the helical potentiometer 27 moves from its prior setting provides a reading therefrom of a value which represents the summation E.M.F. produced by the gyromagnetic resonance.

Thus the operator first adjusts the rheostat 26 so that the galvanometer has a null reading with no sample in the probe, then inserts an earth core in the probe, adjusts the helical potentiometer 27 until the reading on the meter is again null and, taking the new setting of the helical potentiometer and comparing it with the prior setting, determines the resultant summation induced E.M.F. due to the precessing nuclei in the oil and water. The core is then removed, placed in the ice bath and then returned into the probe, the helical potentiometer 27 being again varied until a null reading occurs on the galvanometer 25, the dial setting of the helical potentiometer indicating the summation of induced E.M.F. due to the precessing nuclei in the oil alone in the core. From these two readings the operator may readily determine the ratio of the oil to the water in the mixture.

Referring to FIG. 4 there is shown a novel system which may be employed in measuring the amount of a certain type of nuclei or other gyromagnetic portion of an atom present in the substance of a flowing process. For example, it is very desirable in some instances to be able to rapidly determine the moisture content in the substance in a flowing process such as in flour mills, cereal mills, etc. The system disclosed in FIG. 4 indicates how a fixed amount by weight of material may be introduced into gyromagnetic resonance apparatus, the apparatus then measuring the E.M.F. induced by resonance from the nuclei in the water in this fixed amount of material. Thus, from knowing the weight of the substance under investigation and the E.M.F. induced therefrom by the nuclei in the water of this material, one may determine the moisture content or the relative amount of water by weight in this material. A chute or conveyor means 31 is shown which delivers a quantity of a substance such as cereal into a fixed hopper carried by bracket 31', the hopper having a cylindrical portion 32 of a diamagnetic material such as glass. A base portion 32' is shown slip-fitted over the bottom of the portion 32 and is moved downwardly, after a certain fixed amount by weight of cereal has flowed into the hopper 32, until the lower tip of base portion 32' engages the upper edge of the bottom side of chute 33'. The right hand end of lever 33 is raised and, through the medium of lever length 34, drops the cutoff door 35 in the conveyor or chute 31 to stop the flow of cereal. The gyromagnetic resonance equipment including the magnet, transmitter coil and receiver coil adjacent the hopper and the receiver and transmitter circuits then functions to give a nuclear resonance signal, the signal being produced on an oscilloscope as in FIG. 1, the E.M.F. of the signal being indicated on a helical potentiometer dial as in FIG. 3. After the measurements, the motor 30 mounted on the base portion 32' is operated to cause the trap door 30' to pivot clockwise and allow the cereal in the hopper 32 to flow into the chute 33'. The upper edge of the trap door moves under the bottom edge of hopper 32 and keeps the base portion 32' from returning upwardly until such time as the motor 30 is operated to return the trap door in a counter-clockwise direction to its closed position, at which the base portion 32' slips up the hopper 32 and thus raises the trap door 35 to allow another volume of cereal to enter the hopper 32 for subsequent examination. The motor 30 may be manually operated or it may be automatically operated at fixed time periods.

In FIG. 5 there is shown a portion of gyromagnetic apparatus which may be used in moisture measurements similar to those conducted in FIG. 4. Positioned between the magnet pole faces 41 and within a pick-up coil 42 is a hollow cylindrical receptacle 43 of a diamagnetic material such as glass designed to hold a quantity of a gyromagnetic substance to be investigated. The transmitter coil is not shown. A calibrated sample 44 of such substance having an optimum relative proportion of water is positioned in the receptacle on a base 45 supported on a spiral spring 46. The tension of the spring is such that under the weight of the calibrated sample 44 the spring 46 is displaced to the point where the calibrated sample is centered exactly within the field produced by the magnet and within the receiver coil 42 as shown in the drawing.

This calibrated sample may be utilised in a system of the type shown in FIGS. 2 and 3 with the probe such as 2 of FIG. 2 being adapted in the manner shown in FIG. 5. The helical potentiometer of FIG. 3 is set to that value which will give a null reading of the galvanometer with the gyromagnetic resonance signal obtained from the optimum calibrated sample. A suitable volume of the gyromagnetic substance to be examined is then placed in the receptacle 43 on top of the calibrated sample 44 such that it compresses the spring 46 and is lowered into the space between the magnet poles 41, thus displacing the calibrated sample to a lower position, and the nulei in the substance will produce a nuclear resonance signal. If the moisture in this substance is of the optimum proportion as in the calibrated sample, the galvanometer will register a null reading, but if the amount of moisture in the sample is either greater or less than the optimum amount the galvanometer will be displaced to one side or the other and an adjustment of the helical potentiometer will be necessary to balance the galvanometer. This variation of the helical potentiometer will give a direct reading as to the deviation of the moisture in the sample from the optimum value. When the sample under investigation is removed from the receptacle 43, the calibrated sample will spring back into position and the helical potentiometer may be varied to give a null reading on the galvanometer, and thus prepare the system for the next sample.

Referring to FIG. 7, there is shown a novel gyromagnetic resonance system wherein changes in the density of the substance of a flowing process are automatically compensated for so that the information received from the system is a true indication of the percentage of moisture in the substance.

The gyromagnetic signal which is obtained from the nuclei in the flowing process is dependent upon the density of the substance, since the denser the substance the more nuclei are contributing to the signal. Therefore, in order to determine the percentage of moisture in a given volume of the substance, it is necessary to compensate for changing densities of the substance. In this present figure there is shown a gamma ray apparatus for measuring the density of the substance under investigation. This density information is automatically compared with the nuclear resonance signal and a resultant is obtained from which the percentage of moisture in the substance may be readily determined.

The substance 51, which, for example, may be a cereal, is continuously transmitted through a conduit 52 which is of a diamagnetic non-conducting material such as glass, the cereal moving continually through the conduit due to the screw 53 and motor 54 apparatus which passes the cereal out from the conduit. The conduit is positioned closely adjacent the transmitter coil 55 and receiver coil 56 and is directed so that the gamma rays emitted from the source 57 pass through the cereal within the conduit. A gamma ray detector 58, for example, a scintillation counter, is positioned so as to detect the gamma ray after it has passed through the cereal. The output of the scintillation counter is coupled through amplifiers 59 to an integrator circuit 61. The output from this integrator circuit is coupled through a resistor 62 and the coil 63 of a tuning circuit, which also includes a condenser 64 in parallel with the coil 63, to the control grid 65 of a remote cutoff R.F. amplifier tube 66. The output from the R.F. amplifier 67, the input of which is coupled to the receiver coil 56, is coupled through a condenser 68 to the control grid 65 of the amplifier tube. The output of the amplifier tube 66 is coupled to a detector 69 and thence to an oscilloscope 72 and an integrator system 71 similar to those shown in FIGS. 2 and 3.

In operation, as the cereal passes through the conduit at a rate which is determined by the feeding screw 53, the gamma ray passes through the cereal and, since the amount of gamma ray absorbed by the cereal is proportional to the density of the cereal, the output from the gamma ray detector 58 is therefore inversely proportional to the density of the cereal. The output from the scintillation counter is amplified and transmitted to the integrator circuit 61, the output of which is a D.C. voltage which is inversely proportional to the density of the cereal. This D.C. voltage provides the control grid bias for the R.F. amplifier tube 66 and, as the density of the cereal increases, the positive grid bias on the control decreases and, therefore, tends to decrease the gain of the amplifier tube. The nuclear resonance signal obtained from the cereal is proportional to the density. As the density increases, the amplitude of the nuclear resonance signal increases and therefore the input signal on the control grid of the amplifier tube from the R.F. amplifier increases, thus tending to increase the output signal of this amplifier tube. In this way any increases or decreases in the nuclear resonance signals which are due to changes in density of the cereal, as distinguished from changes in the signal due to changes in the percentage of water present in the cereal, are compensated for in the amplifier tube, and the output from this amplifier stage is therefore proportional to the percentage of moisture in the cereal. This output from this amplifier tube is then transmitted to the detector circuit 69 and thence to the null balancing circuit in the integrator system 71 to give results which may be easily read from the helical potentiometer dial.

Referring to FIGS. 8 and 9, there is shown another integrator circuit which may be utilized in place of the integrating system disclosed in FIG. 3. In these gyromagnetic resonance systems the receiver and transmitter coils in the probe are positioned mutually perpendicular to eliminate as much as possible any direct inductive coupling between the two. However, some direct leakage may be present even though various balancing schemes are utilized to eliminate this leakage. Therefore, the signal which is received by the pick-up coil and transmitted through the subsequent receiver system is composed of the signal due to the resonance plus the leakage signal. The integrated signal output contains this leakage signal as a part thereof and it is desirable to eliminate this portion of the total output signal to give only the true output produced by the nuclear resonance. This may be successfully done by utilizing this novel integrating system disclosed in FIGS. 8 and 9.

The probe 81 which contains the transmitter coil, the receiver coil and the sample is positioned between the pole faces of the magnet 82. The sweep coils 83 are supplied with the varying sweep signal to periodically vary the magnetic field and thus sweep through the point of resonance. The particular sweep signal used is a triangular wave form. A square wave generator 84 is synchronized with the triangular wave generator 85 and produces a square wave output which is related to the triangular wave as shown in FIG. 9, the frequency of the square wave being twice the frequency of the triangular wave. The points at which nuclear resonance occur are noted on the triangular wave by the points labeled $H_o$. It is noted that these points of resonance occur during the time when the square wave is at its high level. The low level of the square wave occurs during the intervals between each period of resonance. The square wave output from this generator 84 is transmitted to a relay 92 which has two pairs of make-break contacts, the relay operating to one position during the high level of the square wave and operating to the other position during the low level of the square wave. Other switching means could be used such as a relay operated double-throw, double pole switch or electronic tube switches. The receiver coil of the probe is connected to an R.F. amplifier 86, then to a detector or demodulator 87, the output of which is coupled to a cathode follower amplifier 88. The D.C. signal from this cathode follower, which is composed of the signal due to the inductive leakage between the transmitter and the receiver coil and the signal induced in the receiver coil by the precessing nuclei, is transmitted to the integrator circuit which comprises the resistor 89 and condenser 91. The condenser is connected to the relay contacts so that during the high level of the square wave the condenser 91 is connected in one direction with respect to the resistor 89 and during the low level of the square wave signal the condenser 91 is connected in the opposite direction. With the condenser 91 connected up in one direction during the period of resonance as indicated by the point $H_o$ on the triangular wave, the integrator circuit receives the signal which is the sum of the leakage signal and the nuclear resonance signal and integrates these two signals together while during the periods between the resonance signal periods, that is, when the square wave is at it low level, the integrator circuit receives a signal which is due only to the leakage since resonance is not being produced during this period. During this latter period the condenser has been reversed and, therefore, the signal received during this non-resonance period is subtracted from the signal received during the resonance period. Or, in other words, the leakage signal is subtracted from the signal due to the nuclear resonance signal plus the leakage signal and, therefore, the remaining integrated signal is only due to the nuclear resonance signal. The output from this flip-flop integrator circuit may be connected to a null balancing indicator circuit in much the same manner as disclosed in FIG. 3.

It will be recognized that the above-described apparatus of FIG. 8 is a harmonic detector device The second harmonic detector principle is utilized in this embodiment to eliminate the zero harmonic (or D.C. component) and first harmonic of the resonance signal which, in the simplfied embodiment shown in FIG. 8, is accomplished by the square wave generator, relay and integrator combination operating as an electromechanical phase-selective detector. The signal passing to the D.C. amplifier is proportional to the second and higher harmonic component of the resonance signal.

In the above described flip-flop integrating scheme it was pointed out that the square wave frequency was twice the triangular wave frequency. In some circumstances it is more practical to have both signals of the same frequency and FIG. 10 illustrates how such an integrating circuit could be utilized. The unidirectional polarizing magnetic field is shifted slightly so that the points of resonance occur closer to the high potential points on the triangular wave rather than that at the midpoints as in FIG. 9. In this manner a pair of resonant points may occur during each high level of the associated square wave signal. The integrated signal due to the leakage between the transmitter coil and receiver coil is subtracted during the low level period of the square wave from the integrated signal during the high level of this square wave in the same manner as described in the operation of the method in FIG. 9. The apparatus which would be utilized in this embodiment of FIG. 10 would be the same as that disclosed in FIG. 8.

Another type of flip-flop integrator circuit which may be utilized in place of that shown in FIG. 8 is disclosed in FIG. 11. Only so much of the apparatus necessary to disclose this embodiment is shown. The output from the cathode follower is connected to a relay spring of a make-break type relay 93, the relay being operated from a square wave source synchronized with the sawtooth sweep wave in the same manner as shown in FIG. 8. The make-break contacts are coupled to two integrator circuits 94 and 95, the output of these two integrator circuits being proportional only to the signal received by the pick-up coil due to the precessing nuclei, the leakage signals being subtracted therein.

It should be noted that novel features of this invention may be employed by utilizing methods other than the nuclear induction method described herein; for example, the absorption or single-coil method of gyromagnetic resonance may be employed to advantage.

Since many changes could be made in the above construction of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of distinguishing portions of atoms of one substance having gryomagnetic properties from like portions of atoms of a different substance mixed with the first substance without the separation of the substances, the like portions of atoms having similar resonance frequencies which comprises the steps of producing and detecting gyromagnetic resonance of the portions of atoms of both substances simultaneously while in one state of existence, changing the state of existence of the substances to thereby inhibit the gyromagnetic resonance characteristics of one of said substances relative to the other substance, and then producing and detecting gyromagnetic resonance of the portions of atoms while the substances are in the changed state to thereby permit comparison of the two resonances.

2. The method as claimed in claim 1 wherein the step of changing the state of existence of the substances comprises changing the temperature thereof.

3. The method of distinguishing between a plurality of mixed substances without the separation of the substances, the substances having like portions of atoms which possess gyromagnetic properties and which have similar gyromagnetic resonance frequencies which comprises the steps of producing and detecting gyromagnetic resonance of the portions of atoms in both instances while the substances are in one state of existence, changing the state of existence of the substances to thereby inhibit the gyromagnetic resonance characteristics of one of said substances relative to the other substance, again producing and detecting gyromagnetic resonance of the portions of atoms in the latter state, and comparing the two gyromagnetic resonances.

4. The method of distinguishing portions of atoms having gyromagnetic properties of one substance from like portions of atoms of another substance mixed with the first substance, the gyromagnetic resonance frequencies of the atom portions in the two substances being similar, without separation of the substances which comprises producing a unidirectional magnetic field enveloping the substances, applying a radio frequency magnetic field to said substances substantially at right angles to said unidirectional magnetic field and substantially at the Larmor frequency of said atom portions to thereby produce gyromagnetic resonance of said atom portions in said unidirectional magnetic field, detecting the E.M.F. of the resultant gyromagnetic resonance signal, changing the state of existence of both of said substances after said E.M.F. detection to thereby change the gyromagnetic resonance characteristics of one of said substances relative to the other substance, again detecting the E.M.F. of the resultant gyromagnetic resonance signal produced by the gyromagnetic resonance of said atom portions after said change in existence of the substance, and comparing the E.M.F. two detected signals.

5. A method of distinguishing portions of atoms having gyromagnetic properties of one substance from like portions of atoms of another substance mixed with the first substance which comprises the steps of first placing the mixed substances in a first state of existence and subsequently placing them in a second state of existence, the gyromagnetic resonance characteristics of said atom portions when in said first state of existence being appreciably different than when in said second state of existence, producing a unidirectional magnetic field enveloping the substances while one or the other of the two states of existence, applying a radio frequency magnetic field to said substances in the two states substantially at right angles to said unidirectional magnetic field to thereby produce gyromagnetic resonance of said atom portions in the substances in each of the two states of existence at an angle to both said unidirectional field and said applied alternating field, detecting the E.M.F. of said gyromagnetic resonance and comparing the two detected E.M.F.'s.

6. A method of measuring the ratio of oil to water in a geological core which comprises the steps of producing and measuring the nuclear magnetic resonance signal from the hydrogen nuclei in the oil and water in a sample from the core with the sample substantially above the temperature at which water freezes, this nuclear magnetic resonance signal being directly related to the total amount of oil and water in the core, producing and measuring the nuclear magnetic resonance signal from the hydrogen nuclei in the oil and water in a sample from the core with the sample at or below the temperature at which water freezes, said latter measurement being due substantially to the hydrogen in the oil, and comparing the two resonance signals to obtain an indication of the ratio of oil to water in the core.

7. The method of determining the proportion of oil and water in a mixture of the same which comprises the steps of producing and detecting nuclear magnetic resonance of the hydrogen nuclei in said mixture with said mixture at a temperature substantially higher than the temperature at which water freezes, subsequently lowering the temperature of the mixture to a point where water freezes, producing and detecting gyromagnetic resonance of the hydrogen nuclei in the oil and water with said water frozen, and observing any differences in the nuclear resonance signals obtained in the two instances, said differences serving as an indication of the proportion of water to oil in the mixture.

References Cited in the file of this patent

UNITED STATES PATENTS

| | | |
|---|---|---|
| 2,499,626 | Bowman | Mar. 7, 1950 |
| 2,561,489 | Bloch et al. | July 24, 1951 |
| 2,665,409 | Rogers | Jan. 5 1954 |
| 2,799,823 | Shaw et al | July 16, 1957 |

FOREIGN PATENTS

| | | |
|---|---|---|
| 597,800 | Great Britain | Feb. 3, 1948 |

OTHER REFERENCES

Physical Review, vol. 73, No. 7, April 1, 1948, pp. 679–712, article by Bloembergen et al.

Shaw et al.: Journal of Chemical Physics, vol. 18, No. 8, August 1950, pp. 1113, 1114.

Bloch et al.: Physical Review, vol. 70, No. 7–8, pp. 474–485.

Gabillard et al.: Academie des Sciences Comptes Rendus (1951), vol. 233, pages 480–482.

Pound et al. The Review of Scientific Instruments, vol. 21, March 1950, pages 219–224.

Holroyd et al.: Journal of Applied Physics, vol. 22, No. 6, June 1951, pages 696–705.

Staub et al.: Helvetica Physica Acta, vol. 23, 1950, pages 63 to 92.

Soutif.: Revue Scientifique, vol. 89, No. 4, July 1951; pp. 204, 205, 220 and 221 principally relied on.

Pound et al.: Physical Review, vol. 85, No. 6, March 15, 1952, page 1062.

UNITED STATES PATENT OFFICE
CERTIFICATE OF CORRECTION

Patent No. 3,068,398　　　　　　　　　　　　　　December 11, 1962

James N. Shoolery et al.

It is hereby certified that error appears in the above numbered patent requiring correction and that the said Letters Patent should read as corrected below.

Column 6, line 33, after "which" insert -- time --; line 43, for "receptacle" read -- receptable --; line 55, for "utilised" read -- utilized --; column 10, line 41, after "E.M.F." insert -- of the --; line 52, after "while" insert -- in --.

Signed and sealed this 12th day of November 1963.

(SEAL)
Attest:

ERNEST W. SWIDER　　　　　　　　　　　　　　　EDWIN L. REYNOLDS

Attesting Officer　　　　　　　　　　　　Acting Commissioner of Patents